United States Patent
Hamilton, II et al.

(10) Patent No.: US 7,806,072 B2
(45) Date of Patent: Oct. 5, 2010

(54) MERCURY RELEASE ALERTING

(75) Inventors: Rick A. Hamilton, II, Charlottesville, VA (US); Paul A. Moskowitz, Yorktown Heights, NY (US); Brian M. O'Connell, Cary, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 12/325,323

(22) Filed: Dec. 1, 2008

(65) Prior Publication Data

US 2010/0132607 A1    Jun. 3, 2010

(51) Int. Cl.
G08B 21/12 (2006.01)
F21V 33/00 (2006.01)
(52) U.S. Cl. ..................... 116/214; 340/605
(58) Field of Classification Search .......... 116/214; 362/96, 101; 422/119; 340/605
See application file for complete search history.

(56) References Cited

U.S. PATENT DOCUMENTS

| | | | |
|---|---|---|---|
| 1,535,157 A * | 4/1925 | Hughes et al. | 422/241 |
| 2,447,922 A * | 8/1948 | Tuck | 362/267 |
| 2,606,101 A * | 8/1952 | Sundstrom | 436/3 |
| 2,749,536 A * | 6/1956 | Sperling | 73/40.5 R |
| 3,695,009 A | 10/1972 | Osteen | |
| 4,354,942 A | 10/1982 | Kaczur et al. | |
| 4,404,923 A * | 9/1983 | Smith | 116/214 |
| 4,965,490 A * | 10/1990 | Ratner | 313/569 |
| 5,055,822 A * | 10/1991 | Campbell et al. | 340/407.1 |
| 5,229,686 A | 7/1993 | Fowler et al. | |
| 5,229,687 A | 7/1993 | Fowler et al. | |
| 5,596,314 A * | 1/1997 | Goldstein | 340/632 |
| 5,736,813 A | 4/1998 | Foust et al. | |
| 5,754,002 A | 5/1998 | Haitko et al. | |
| 5,777,434 A | 7/1998 | Dietrich et al. | |

(Continued)

FOREIGN PATENT DOCUMENTS

CN    201156287 Y  *  11/2008

(Continued)

OTHER PUBLICATIONS

Garvin, Jennifer, Jama Studies Support of Dental Amalgam, American Dental Association Web Site, http://www.ada.org/prof/resources/pubs/adanewsarticle.asp?articleid=1881, Apr. 10, 2008. 2 pgs.

(Continued)

*Primary Examiner*—R. A. Smith
(74) *Attorney, Agent, or Firm*—Patrick J. Daugherty; Driggs, Hogg, Daugherty & Del Zoppo Co., LPA (57) ABSTRACT

Methods provide an alert to the release of mercury. A sealed container containing an odor-producing agent is provided proximate to a sealed breakable enclosure containing mercury, the container and/or the breakable enclosure physically separating the agent from the mercury. In response to a breaking of the breakable enclosure, the agent produces an odor as a function of the breaking, the odor providing an alert to a release of the mercury. Service methods are also provided, for example wherein a service provider provides the sealed breakable enclosure containing mercury and deploys the odor-producing agent. Articles of manufacture, systems, articles and programmable devices are also provided.

20 Claims, 4 Drawing Sheets

U.S. PATENT DOCUMENTS

| | | | |
|---|---|---|---|
| 5,923,121 A | 7/1999 | Boyce et al. | |
| 5,949,189 A | 9/1999 | Foust et al. | |
| 5,998,927 A | 12/1999 | Foust et al. | |
| 6,169,362 B1 | 1/2001 | Klinedinst et al. | |
| 6,229,260 B1 | 5/2001 | Haitko et al. | |
| 6,489,721 B1 | 12/2002 | Haitko et al. | |
| 6,515,421 B2 | 2/2003 | Dietrich et al. | |
| 6,536,910 B2 * | 3/2003 | Lin | 362/96 |
| 6,685,824 B2 | 2/2004 | Frankiewicz et al. | |
| 6,690,462 B2 * | 2/2004 | Seltzer | 356/316 |
| 6,841,939 B2 | 1/2005 | Scott et al. | |
| 6,843,199 B2 * | 1/2005 | Abe et al. | 116/106 |
| 6,853,118 B2 | 2/2005 | Haitko et al. | |
| 7,030,559 B2 | 4/2006 | Klinedinst et al. | |
| 7,066,172 B2 * | 6/2006 | Pasternack | 128/202.22 |
| 7,089,780 B2 * | 8/2006 | Sunshine et al. | 73/23.2 |
| 7,176,626 B2 | 2/2007 | Klinedinst et al. | |
| 7,246,919 B2 * | 7/2007 | Porchia et al. | 362/276 |
| 7,528,732 B2 * | 5/2009 | Tajima et al. | 340/577 |
| 7,618,151 B2 * | 11/2009 | Abbondanzio et al. | 362/96 |
| 2004/0188298 A1 | 9/2004 | Shatford et al. | |
| 2010/0117828 A1 * | 5/2010 | Goldman et al. | 340/540 |

FOREIGN PATENT DOCUMENTS

| | | |
|---|---|---|
| JP | 05-290805 | 5/1993 |
| JP | 9293483 | 11/1997 |
| JP | 2009187227 A * | 8/2009 |
| SU | 1135897 A * | 1/1985 |
| WO | 2006078058 A2 | 7/2006 |

OTHER PUBLICATIONS

Spills, Disposal, and Site Cleanup, http://www.epa.gov/mercury/spills/index.htm, Apr. 10, 2008, 8pgs.

Health Effects, http://www.epa.gov/mercury/effects.htm, Apr. 10, 2008, 3 pgs.

Lenny Bernstein et al., Summary for Policymakers, An Assessment of The Intergovernmental Panel on Climate Change, IPCC, Nov. 2007, 22 pgs.

* cited by examiner

MERCURY RELEASE ALERTING

FIELD OF THE INVENTION

The present invention generally describes methods, systems and devices for providing an alert to the release of mercury from, and in particular providing embodiments for alerting to the release of mercury from lighting components, in some examples further suppressing released mercury in order to abate mercury exposure hazards.

BACKGROUND OF THE INVENTION

Concerns about global climate change resulting from greenhouse gas emissions has resulted in large scale efforts to reduce the use of energy, in order to thereby reduce greenhouse gas emissions associated with the generation and use of the energy. In one example in 2007 the United States of America mandated an energy efficiency increase of 30 percent for light bulbs by 2012. One common method of increasing lighting efficiency is replacing incandescent light bulbs (ILB's) with compact fluorescent lights (CFL's) and light emitting diodes (LED's), as each are more efficient sources of light, using less electricity to generate comparable levels of ILB light.

Fluorescent lights generally contain the element mercury, and CFL's typically contain several milligrams of mercury. At room temperature, mercury is a liquid that has a high vapor pressure. The mercury is vaporized further when an electrical discharge is initiated within the bulb, and it is the excitation of mercury atoms which produces the light emitted by fluorescent light bulbs.

Mercury vapor is toxic to humans, and concerns arise with the safe handling and disposal of CFL's and other fluorescent lights. More particularly it has been determined that elemental (metallic) mercury causes negative health effects when breathed as a vapor and absorbed through the lungs. Such exposures can occur when elemental mercury is spilled or products that contain elemental mercury break and expose mercury to the air, particularly in warm or poorly-ventilated indoor spaces. Health effects from exposure to mercury may include tremors, emotional changes (e.g., mood swings, irritability, nervousness and excessive shyness), insomnia, neuromuscular changes (e.g. weakness, muscle atrophy, twitching), headaches, disturbances in sensations, changes in nerve responses, performance deficits on tests of cognitive function, damage to kidneys, respiratory failure, and death.

During normal fluorescent light operation, liquid mercury and mercury vapors are contained within the bulbs, and exposure to mercury becomes a concern in the event of breakage of a fluorescent light and in the disposal of a no-longer functioning light. Mercury vapor produced by spilled mercury is a danger to human beings and animals, particularly within enclosed areas such as homes and offices, and mercury spills may be difficult and expensive to abate and clean up. Difficulties in safely and economically disposing of CFL's, as well as fears of potential exposure to toxic mercury therein, have limited public acceptance of the CFL as a replacement for incandescent light bulbs, thereby hampering efforts to reduce household energy usage for lighting tasks and associated greenhouse gas emissions.

SUMMARY OF THE INVENTION

Methods are provided for providing an alert to the release of mercury. A sealed breakable enclosure containing mercury and a sealed container proximate to the enclosure and containing an odor-producing agent are provided, wherein the container and/or the breakable enclosure physically separate the agent from the mercury. In response to a breaking of the breakable enclosure, the agent produces an odor as a function of the breaking, the odor providing an alert to a release of the mercury. Service methods are also provided, for example wherein a service provider provides the sealed breakable enclosure containing mercury and deploys the odor-producing agent.

Methods also provide an alert to the release of mercury wherein computer executable program code is stored on a computer readable medium provided to be deployed and executed on a programmable device, the program code comprising instructions which, when executed on the programmable device, cause the device to determine a breaking of a sealed breakable enclosure containing mercury and responsively deploy an odor-producing agent from a sealed container proximate to the enclosure (at least one of the breakable enclosure and the container physically separating the agent from the mercury), the agent producing an odor as a function of the breaking, the odor providing an alert to a release of the mercury. Devices with breakable enclosures containing mercury and proximate sealed containers containing an odor-producing agent are also provided (at least one of the breakable enclosure and the container physically separating the agent from the mercury), in response to a breaking of the breakable enclosure the device agent produces an odor as a function of the breaking, the odor providing an alert to a release of the mercury.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience the Detailed Description of the Invention has the following sections:

I. General Description; and

II. Computerized Implementation.

I. General Description

Figure 1:
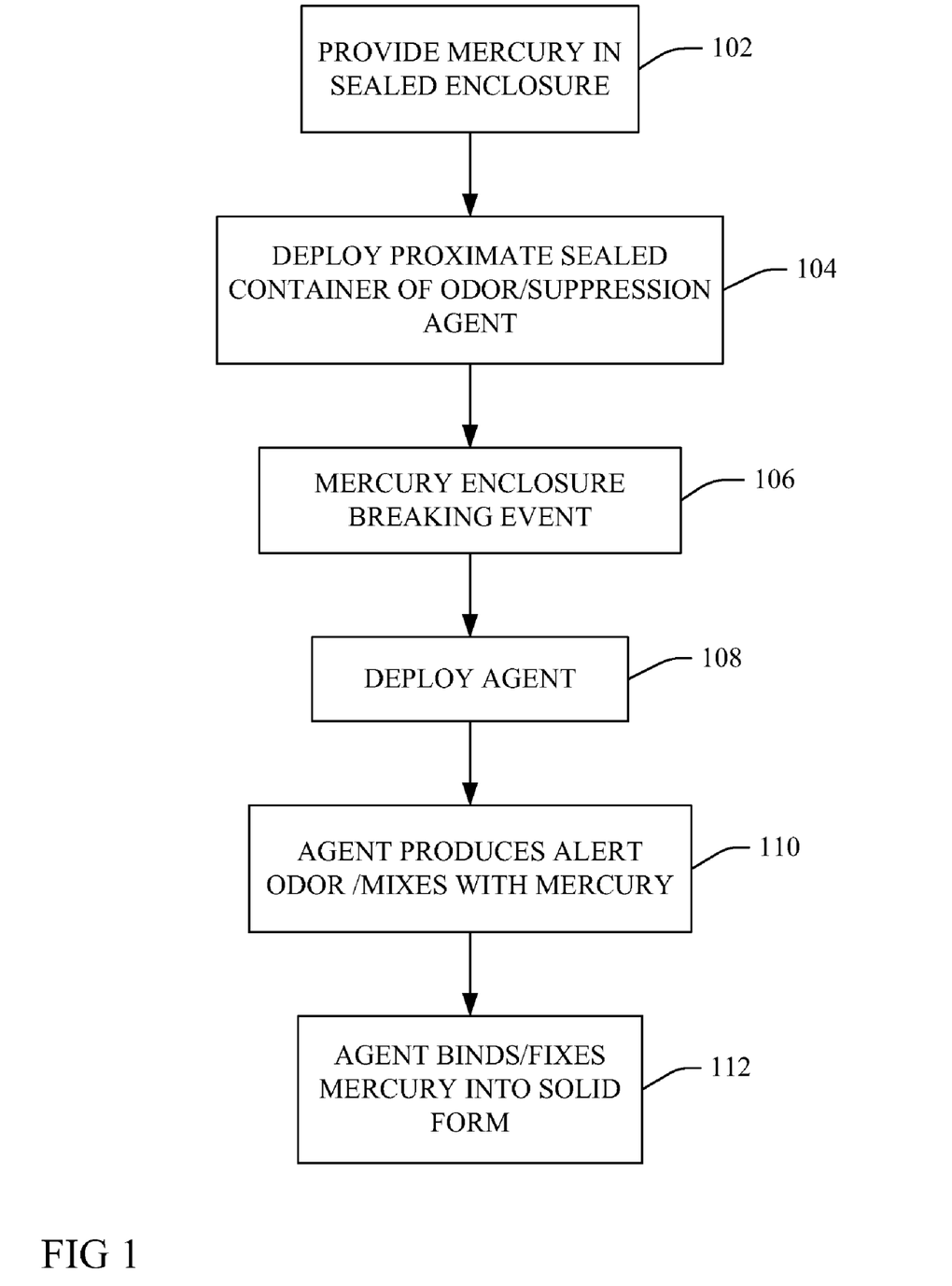
FIG. 1 is a flow chart illustrating a method and system for providing an alert to the release of mercury according to the present invention.

FIG. 1 is a flow chart illustrating a method and system for providing an alert to the release of mercury. At 102 a sealed breakable enclosure containing mercury is provided, and at 104 an odor-producing (and optionally also a mercury-suppressing) agent is deployed within a sealed container proximate to the enclosure, the agent and mercury physically separated by at least one of the breakable enclosure and the container. A breaking of the breakable enclosure at 106 (e.g. in fact, or as determined or detected from an event observation or an input) causes an automatic deploying of the agent from the container at 108, the deploying causing the agent at 110 to produce an alert odor (and in some embodiments to mix with mercury exposed by the actual or indicated breaking of the sealed breakable enclosure, thereby changing colors or binding the mercury, as discussed more fully below). Moreover, for embodiments incorporating mercury-suppressing agents, as a function of the mixing at 110, at 112 the agent binds with (forming one or more compounds with) or otherwise fixes the mercury into a solid form, in one aspect reducing vapor exposure hazard from the mercury and also enabling mechanical clean-up of released mercury.

In one aspect, fixing the mercury into a solid form or compound enables easy clean-up of the mercury, reduces toxic exposure hazards by preventing the mercury from remaining in or changing into a vapor or liquid state upon the breaking of the enclosure, and may also form a compound safe to handle and dispose of within conventional solid waste systems. Moreover, automatically producing a strong odor provides an alert that a mercury-containing enclosure has been broken, which is particularly useful and desired in the case of interior fluorescent, CFL or mercury vapor light applications, thus alerting occupants to the presence of mercury liquid or vapor in a closed interior airspace. The present invention may also be used for alerting and/or suppression with other devices incorporating mercury in sealed enclosures. Illustrative but not exhaustive examples include a thermometer, a pressure gauge, a light switch, a barometer, and a thermostat, and still other appropriate applications will be apparent to one skilled in the art.

The present invention thus enables providing an alert to the release of mercury, as well as safely abating or preventing the spilling of the liquid mercury present within broken fluorescent and compact fluorescent light bulbs, and the mercury vapors otherwise produced by the spilled mercury. Prior art methods teach the mechanical removal of broken components, but do not provide for removing spilled droplets that may become lodged in surfaces. The United States EPA recommends spreading powdered sulfur as a means of neutralizing liquid mercury and suppressing vapors, as sulfur and mercury form a stable compound; powdered copper and zinc may also be used as these metals also form stable alloys or amalgams with mercury. However, homes and offices are not generally equipped with powdered sulfur, copper, or zinc, and thus such recommendations have little value to an average household or business in immediately and timely abating a mercury spill before mercury vapors or spilled liquid mercury present a health hazard.

The present invention provides for methods and apparatuses that build mercury-suppressing agents directly into the structure of fluorescent bulbs in such a way that mercury-suppressing agents may be released when the bulb is broken, and alerting odors automatically generated. In some embodiments, organic sulfur-containing compounds are used within the agent, providing advantages through the distinctive and strong odor characteristics of sulfur compounds. Thus, in some examples, Mercapton is incorporated in the agent, a well-known strong and distinctive odor-generating compound generally mixed into natural gas provide an odor alert to persons of gas leaks. Using powdered sulfur within the agent also provides visual clean-up advantages, the powered sulfur changing colors from yellow to brown and thereby making a mercury-sulfur compound resulting from mixing with the mercury easy to see, as well binding the mercury into a stable compound that is easily removed, and further suppressing the vapor of any missing mercury.

Other elements and compounds are also appropriate for use as odor-generating and/or mercury suppressing agent constituents. Powdered copper and zinc and organic compounds shown to be active in the removal of mercury are also appropriate for use as mercury-suppressing agents, including organic compounds containing at least one sulfur atom that is reactive with mercury. Examples of appropriate organic compounds include, but are not limited to, dithiocarbamates, either in the monomeric or polymeric form, sulfurized olefins, mercaptans, thiophenes, thiophenols, mono and dithio organic acids, and mono and dithioesters. Inorganic sulfur compounds may also be used, and illustrative but not exhaustive examples of suitable inorganic sulfur compounds include sulfides, alkali metal thiosulfates, alkaline earth metal thiosulfates, iron thiosulfates, alkali metal dithionites, and alkaline earth metal dithionites.

Compounds produced by the neutralization of liquid mercury by suppressing agents according to the present invention are generally safer than the liquid mercury itself, in one aspect because they are solids with little vapor pressure. Amalgams which are mercury-metal alloys are generally thought safe enough for use in dental fillings. Moreover, although mercury sulfide may pose an inhalation or ingestion hazard, it is a stable compound that is insoluble with little or no vapor pressure and presents a much lower exposure hazard than that posed by the high vapor pressures found with liquid mercury. Liquid mercury also easily combines with organics in water systems to form the poisonous methyl mercury compounds, and thus for this additional reason an amalgam or sulfide compound formed according to the present invention poses a much reduced risk to the environment if placed in a landfill relative to liquid mercury.

Figure 2A:
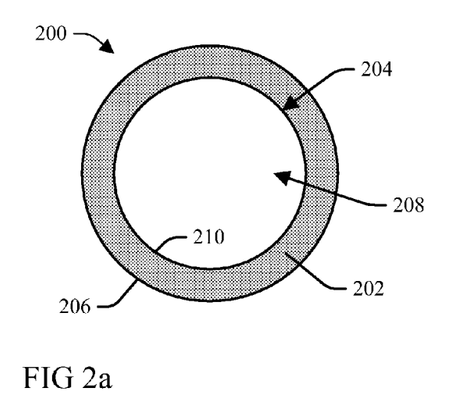
FIGS. 2a through 2e are diagrammatic illustrations of implementations of methods and systems for providing an alert to the release of mercury according to the present invention.

FIGS. 2a through 2e illustrates a variety of embodiments of the present invention. FIG. 2a illustrates a layered mercury-sequestering apparatus 200 according to the present invention. Mercury-suppressing/odor-producing agents 202 are built into an encapsulating structure 206 disposed on an outer glass surface 204 of a sealed breakable enclosure 210 containing mercury 208. This may be done by dissolving or dispersing the agents 202 in a thin plastic layer 206 or paint 206 that is applied to the outside of the glass surface 204 of the enclosure 210. When broken, the outside surfaces 204 of the enclosure 210 become mixed with the mercury 208 contained within. In another aspect mechanical cleanup of a broken enclosure 210 will further enhance the mixing and neutralizing of the free mercury 208 that is placed for disposal within a solid waste receptacle or repository.

Figure 2B:
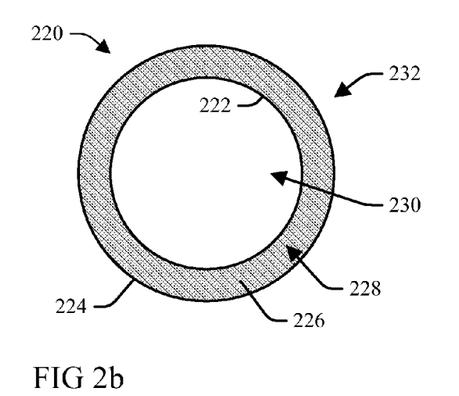

FIG. 2b illustrates a double-bulb mercury-sequestering apparatus 220 comprising an inner glass bulb 222 and an outer glass bulb 224. A mercury-suppressing/odor-producing agent 226 is sequestered in a space 228 between the inner 222 and outer 224 bulbs, thereby prevented from interacting with mercury 230 inside the inner bulb 222 or the environment outside the outer bulb 232 until the bulb 220 is subject to shock. The inner bulb 222 is constructed of material that is weaker than the outer bulb 224 such that any force strong enough to break the outer bulb 224 also breaks the inner bulb 222, thereby ensuring neutralizing of the mercury 230 by the agent 226.

Figure 2C:
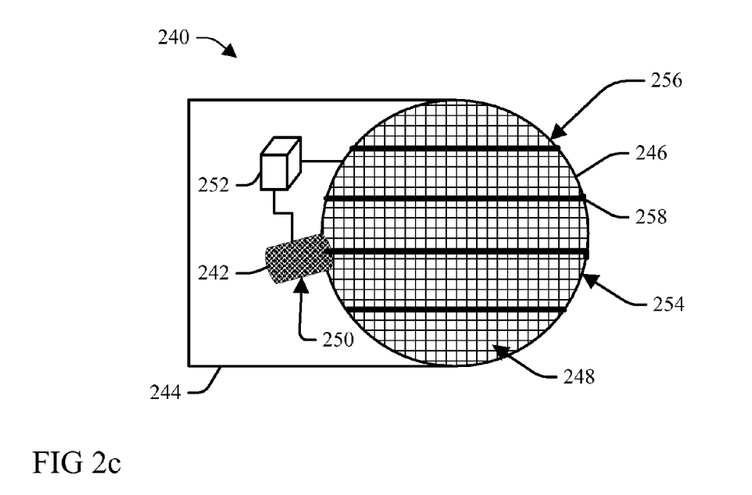

FIG. 2c illustrates a compartment-based mercury sequestering apparatus 240, wherein a container or compartment 242 is built into a base 244 connected to a sealed light bulb 246 containing mercury 248. The container 242 contains a mercury-supressing/odor-producing agent 250 that is accessed in the event the sealed bulb 246 is broken. The agent 250 may be automatically deployed if the bulb 246 is broken, for example in reaction to a change in pressure of the sealed bulb 246 indicating a loss of vacuum or other atmospheric pressure change. In some embodiments, breakage of the bulb 246 is determined by an integrity detection system 252 in communication with the container 242 and with a thin conductive and transparent mesh 254 applied around an outer surface 256 of the glass bulb enclosure 246 such that any breakage of the outer bulb 246 is detected by the mesh 254 and communicated by a signal to the integrity detection system 252, resulting in a direction to the container 242 to immediately and automatically release the agent 250. Moreover, in some embodiments, the mesh 254 also (or instead) comprises a network of thin tubular members 258 deployed about (and in some embodiments encompassing) the bulb outer glass surface 256, the tubular members 258 containing the agent 250 and configured to directly release the agent 250, for example when breakage of the outer bulb 246 causes a rupture of or break in an integrity of a tubular member 258, or through an automatic release triggered by the integrity detection system 252. In some embodiments, the suppressing agent 250 may be manually deployed through a user invocation of a container 242 or tubular member 258 release.

Figure 2D:
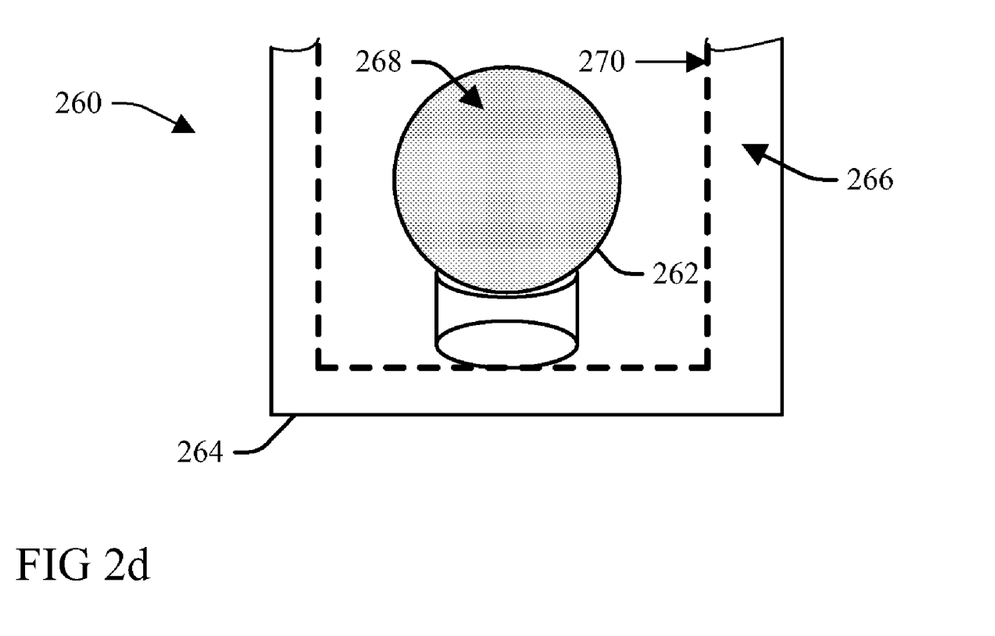

FIG. 2d illustrates a packaging-based mercury sequestering apparatus 260. It is known for a consumer to buy one or more compact florescent lights packaged in disposable materials commonly discarded when the light is placed in service. According to the present invention, a light bulb 262 is sold or otherwise provided with a packaging 264 that contains mercury-suppressing/odor-producing agents 266 disposed therein and accessible for use and/or distribution through an inner surface 270 of the packaging 264, the consumer directed to place a bulb 262 in the packaging 264 when ready for disposal, the packaging 264 disposed of with the bulb 262 inside. In this embodiment, bulbs 262 that are not currently broken but are perhaps likely to be broken during disposal and landfill ingestion are prevented from releasing their mercury 268 into the landfill or environment, as if the bulb 262 breaks the suppressing agent 266 disposed within the packaging 264 will bind with the released mercury 268.

Figure 2E:
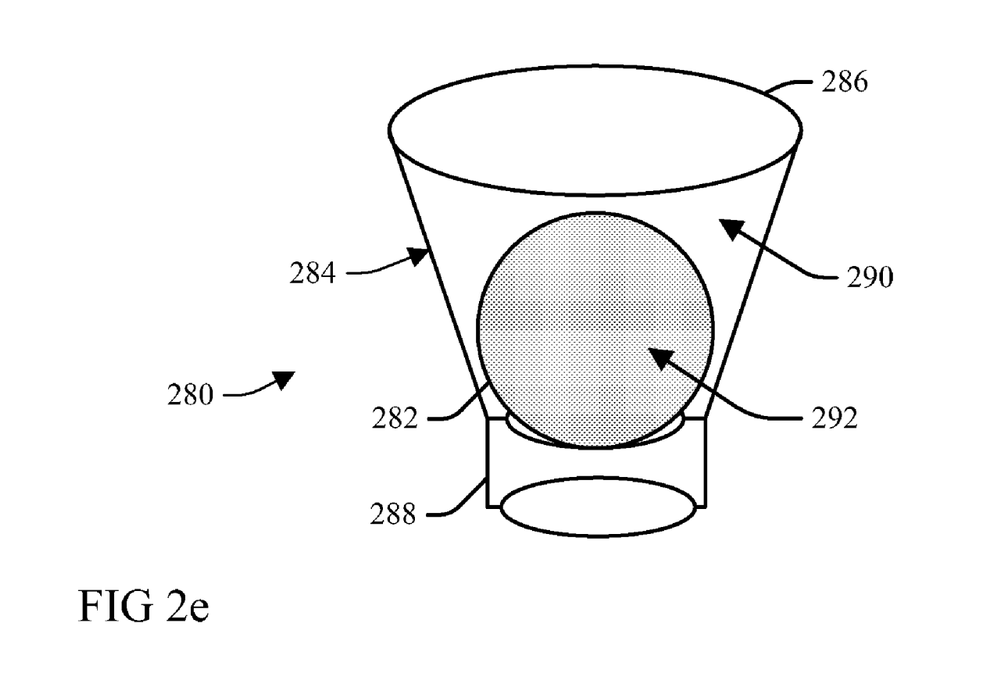

FIG. 2e illustrates a mercury-sequestering floodlight apparatus 280. A compact florescent light 282 is packaged within a sealed outer glass receptacle 284 that has the form factor of a traditional floodlight, defined by a base 288, a conical reflective light body 284 and a translucent lens cap 286. A mercury-suppressing/odor-producing agent 290 is disposed within the outer glass receptacle 284 about the inner CFL 282 and, thus, if the interior CFL 282 suffers breakage, any escaping mercury 292 will be suppressed through combination with the suppressing agent 290.

Figure 3:
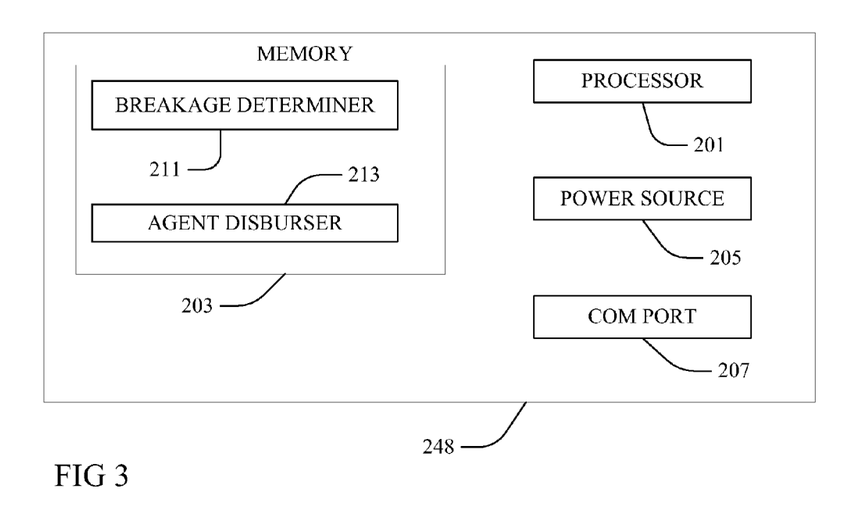
FIG. 3 is a block diagram of a system or device configured to provide an alert to the release of mercury according to the present invention.

FIG. 3 illustrates a programmable embodiment of the mercury suppression and integrity device 248 illustrated in FIG. 2c and described above. The device 248 may be incorporated into a larger system (such as one provided by a service provider) wherein other applications and components of the larger system accomplish systems and methods according to the present invention (for example agents may be released in response to a service provider output); or it may be a standalone device or module 248 configured to perform each of the systems and methods described above. The present embodiment comprises a central processing unit (CPU) or other processing means 201 in communication with a memory 203 comprising logic components that enable the CPU 201 to perform processes and methods according to the present application, as will be understood through reference to FIGS. 1 and 2a through 2e as discussed above. Thus, the memory 203 comprises an enclosure breakage determiner logic component 211 configured to enable the CPU 201 to determine whether an enclosure containing mercury has been broken, and a suppression agent disburser logic component 213 configured to deploy the suppression agent to bind with the mercury, for example, with reference again to FIG. 2c to release the agent from the container 242 or from the tubular membrane 258. A power source 205 is configured to provide operative power to the device 248; examples include battery units 205 and power inputs configured to receive alternating or direct current electrical power, and other appropriate power units 205 will be apparent to one skilled in the art. A communication port or network link/node means ("com port") 207 is also provided and configured to enable data and other communications as may be appropriate, for example as discussed above.

II. Computerized Implementation

Figure 4:
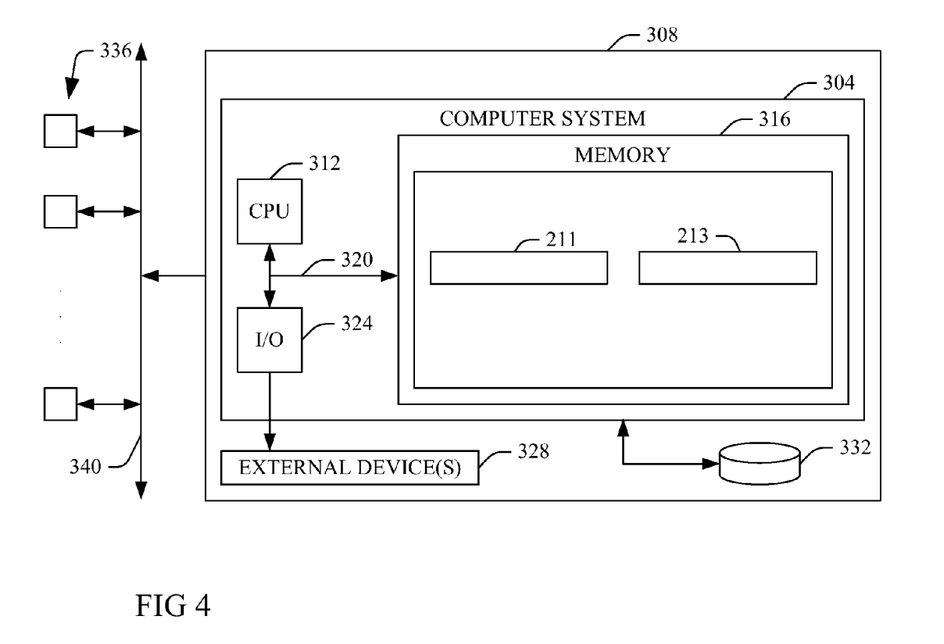
FIG. 4 is a block diagram illustrating a computerized implementation of a method and system for providing an alert to the release of mercury according to the present invention.

Referring now to FIG. 4, an exemplary computerized implementation of the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and systems, and devices as illustrated in FIGS. 1-3 and described above, including the breakage determiner 211 and the suppression agent disburser 213 discussed above, and which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboards, pointing devices, displays, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1-4 above and described otherwise herein. To this extent, the computer-readable/useable medium includes program code that implements each of the various process steps of the present application.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of an application/software program, component software/a library of functions, an operating system, a basic I/O system/driver for a particular computing and/or I/O device, and the like.

Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary," an "another", etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for providing an alert to the release of mercury, comprising:
   providing a sealed breakable enclosure containing mercury; and
   deploying an odor-producing agent within a sealed container, the container proximate to the enclosure, at least one of the breakable enclosure and the container physically separating the agent from the mercury;
   wherein in response to a breaking of the breakable enclosure the agent produces an odor as a function of the breaking, said odor provides an alert to a release of the mercury.

2. The method of claim 1, further comprising suppressing the release of mercury by:
   deploying a mercury-suppressing and odor-producing agent within the sealed container;
   wherein the agent automatically mixes with the mercury as a function of the breaking; and
   the agent fixes the mercury into a solid form as a function of the mixing.

3. The method of claim 2 wherein the breakable enclosure containing mercury is selected from the group consisting of a breakable light bulb configured to emit light in response to an electrical energy input, a thermometer, a pressure gauge, a light switch, a barometer, and a thermostat.

4. The method of claim 2, further comprising a service provider providing the sealed breakable enclosure containing mercury and deploying the agent within the sealed container.

5. The method of claim 2 wherein the agent further comprises an organic sulfur compound, the organic sulfur compound producing the odor.

6. The method of claim 5 wherein the agent further comprises a powder selected from the group consisting of sulfur, copper, and zinc.

7. The method of claim 5 wherein the agent further comprises an odor-producing organic compound selected from the group consisting of a monomeric dithiocarbamate, a polymeric dithiocarbamate, a sulfurized olefin, a mercaptan, a thiophene, a thiophenol, a mono organic acid, a dithio organic acid, a monoester and a dithioester.

8. The method of claim 5 wherein the agent further comprises an inorganic compound selected from the group consisting of a sulfide, an alkali metal thiosulfate, an alkaline earth metal thiosulfate, an iron thiosulfate, an alkali metal dithionite and an alkaline earth metal dithionite.

9. The method of claim 5, further comprising the agent changing color as function of mixing with the mercury.

10. The method of claim 5, further comprising forming the container as a product packaging configured to contain the breakable light bulb for disposal.

11. The method of claim 5, further comprising forming the container as an outer bulb about and encompassing the breakable light bulb, the agent deployed within a space between an outer surface of said breakable enclosure and an inner surface of the outer bulb container.

12. The method of claim 11 further comprising:
   forming the breakable light bulb with an inner bulb material;
   forming the outer bulb container with an outer bulb material stronger than the inner bulb material such that a force strong enough to break the outer bulb container will also break the breakable light bulb.

13. The method of claim 5, further comprising:
   forming the breakable light bulb with a glass structure; and
   deploying the agent in a thin container layer on an outside surface of the glass structure.

14. The method of claim 13 wherein the thin container layer is a plastic layer or a paint layer.

15. The method of claim 5 wherein the deploying comprises deploying the container within the sealed breakable enclosure, further comprising:
   providing an integrity detection system in communication with the breakable enclosure and the agent container, the integrity detection system configured to detect the breaking of the breakable enclosure; and
   automatically releasing the agent from the container for the automatic odor producing and mixing with the mercury as a function of the integrity system detecting the breakable enclosure breaking.

16. The method of claim 15, further comprising:
   deploying a thin conductive transparent mesh applied on a surface of the bulb enclosure and in communication with the integrity detection system comprises;
   the transparent mesh providing a signal to the integrity detection system in response to the breaking of the breakable enclosure; and
   the agent container automatically releasing the agent from the container as a function of an instruction from the integrity detection system response to the signal.

17. The method of claim 16, wherein the deploying the container comprises deploying a tubular transparent mesh container on a surface of the bulb enclosure and in communication with the integrity detection system, further comprising automatically releasing the agent from the tubular transparent mesh container for the automatic odor producing and the mixing with the mercury as a function of the integrity system detecting the breakable enclosure breaking.

18. The method of claim 17, further comprising a service provider providing the integrity detection system in communication with the breakable enclosure and the agent container, the service provider provided integrity detection system configured to automatically release the agent from the container for the automatic odor producing and the mixing with the mercury as a function of the breakable enclosure breaking signal.

19. A method for providing an alert to the release of mercury, comprising:
   producing computer executable program code;
   storing the code on a computer readable medium; and
   providing the program code to be deployed and executed on a programmable device, the program code comprising instructions which, when executed on the programmable device, cause the programmable device to:
   determine a breaking of a sealed breakable enclosure containing mercury; and
   release an odor-producing agent from a sealed container proximate to the enclosure in response to the determined breaking of the breakable enclosure;
   wherein at least one of the breakable enclosure and the container physically separate the agent from the mercury; and
   wherein the agent produces an odor as a function of the breaking, said odor providing an alert to a release of the mercury.

20. A device configured to provide an alert to the release of mercury, comprising:
   a sealed breakable enclosure containing mercury; and
   a sealed container containing an odor-producing agent, the container deployed proximate to the enclosure wherein at least one of the breakable enclosure and the container physically separates the agent from the mercury;
   wherein in response to a breaking of the breakable enclosure the agent produces an odor as a function of the breaking, said odor providing an alert to a release of the mercury.

* * * * *